No. 807,913. PATENTED DEC. 19, 1905.
J. M. DODGE.
SLIP SPROCKET WHEEL.
APPLICATION FILED JUNE 28, 1905.
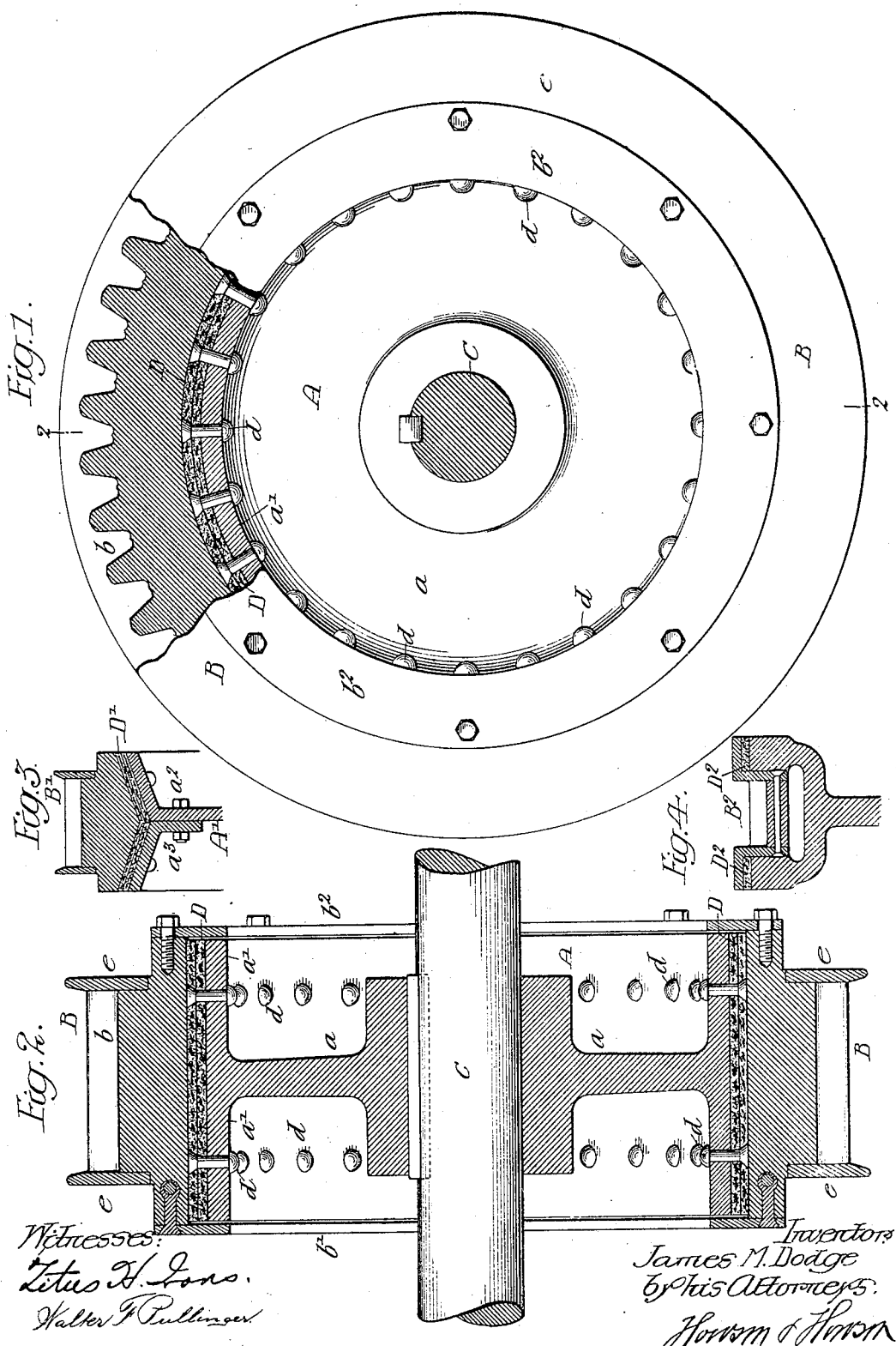

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

SLIP SPROCKET-WHEEL.

No. 807,913.     Specification of Letters Patent.     Patented Dec. 19, 1905.

Application filed June 28, 1905. Serial No. 267,425.

*To all whom it may concern:*

Be it known that I, JAMES M. DODGE, a citizen of the United States, residing in Philadelphia, Pennsylvania, have invented certain Improvements in Slip Sprocket-Wheels, of which the following is a specification.

The object of my invention is to construct a sprocket-wheel for drive-chains in such a manner as to allow the rim of the wheel to slip on the hub when unusual tension is applied to the chain or to the shaft. This object I attain in the following manner, reference being had to the accompanying drawings, in which—

Figure 1 is a side view of my improved sprocket-wheel, partly in section. Fig. 2 is a sectional view on the line 2 2, Fig. 1; and Figs. 3 and 4 are views illustrating modifications of my invention.

A is the hub-section of the wheel, which can be keyed or otherwise secured to the shaft C.

B is the rim-section of the wheel, having sprocket-teeth $b$, shaped according to the type of drive-chain used.

Referring to Figs. 1 and 2, the hub-section A has a web $a$ and flanges $a'\ a'$, forming a flat face. On this face is secured a ring of frictional material D, in the present instance consisting of one or more strips of leather secured to the flanges by two series of rivets $d$. The parts are so proportioned that the rim-section B will fit tightly upon the friction-surface, so that under ordinary conditions the rim-section and hub-section will turn together. In order to prevent lateral movement of the rim-section on the hub-section, I permanently secure a ring $b'$ to one side of the rim and detachably secure a ring $b^2$ to the other side of the rim. Both rings extend over the ends of the flange $a'$. I also preferably provide flanges $e\ e$, which are made in the form of rings and secured to the rim-section on each side of the series of sprocket-teeth to keep the chain in line. These flanges, however, may be dispensed with in some cases.

In Fig. 3 I have illustrated a modification in which the side rings are dispensed with. In this instance the hub-section A' is made in two parts $a^2$ and $a^3$, so shaped as to form an annular V-shaped groove in which the leather or other friction material D' is placed. The ring-section B' is shaped to fit this groove.

In Fig. 4 I have illustrated another modification in which the friction material $D^2$ is on a line with the teeth of the rim-section $B^2$, the rim-section being shaped so as to fit between the flanges of the hub-section $A^2$, thus increasing the frictional surface.

I claim as my invention—

1. The combination in a sprocket-wheel, of an unyielding hub-section, a rim-section having teeth thereon, with a ring of friction material mounted between the hub-section and the rim-section and secured to one section and fitting snugly on the other section, substantially as described.

2. The combination of a hub-section, a rim-section having sprocket-teeth thereon, a leather friction-ring secured to the hub-section and fitting snugly into the rim-section, and side plates on the rim-section acting to retain the rim in line with the hub-section, substantially as described.

3. The combination of a hub-section having central web and side flanges, a friction-ring secured to the periphery of the hub-section by two lines of rivets passing through the flanges of the hub-section, with a rim-section fitting over the friction-ring and having teeth on its periphery, substantially as described.

4. The combination of a hub-section, a ring of friction material secured to the hub-section, a rim-section having teeth said ring being in frictional contact with the friction-ring and having a fixed ring on one side and a detachable ring on the opposite side to keep the rim-section in line with the hub-section, substantially as described.

In testimony whereof I have signed my name to this specification in the presence of two subscribing witnesses.

JAMES M. DODGE.

Witnesses:
     WALTER CHISM,
     JOS. H. KLEIN.